UNITED STATES PATENT OFFICE.

MATTHEW LAFLIN, OF CHICAGO, ILLINOIS.

IMPROVEMENT IN COMPOSITIONS FOR LINING BARRELS, &c.

Specification forming part of Letters Patent No. 189,312, dated April 10, 1877; application filed August 28, 1876.

*To all whom it may concern:*

Be it known that I, MATTHEW LAFLIN, of Chicago, Cook county, State of Illinois, have invented a new and useful Improvement in Linings for Barrels and other containing vessels, of which the following is a full description:

The object of my invention is to prepare a lining for barrels and other articles of cooperage, also vessels made of paper, clay, or metal, which will preserve the contents pure for a long period of time; and its nature consists in mixing paraffine and rosin, as hereinafter more fully described.

The proportions which I deem best are as follows: To sixteen ounces of paraffine add three ounces of the best or "M" rosin of commerce, and melt them together.

The mixture is applied hot to the barrel or other vessel, which is to be shaken around, so that the mixture comes in contact with all of the interior parts when the residue is poured off. This forms a complete lining, which soon becomes hard and glossy, but which retains sufficient elasticity to prevent cracking, and which will exclude the air, or prevent its contact with the contents; and it also prevents the contents from coming in contact with the wood, paper, metal, or other material from which the vessel is made, and thereby preserve them for a long time without change or injury.

In preparing the mixture or compound the proportions stated will be found best; but it it is obvious that more or less of either of the ingredients named will give good results, and I do not therefore confine myself to the proportions stated.

This lining will be found especially valuable in vessels used for transporting or holding mineral waters or other liquids; and it is useful for lining lard, butter, and other packages.

Where a taste of the rosin would injure the contents, let the vessel stand a short time after lining, either empty, or filled with water, before using it.

This composition will also be found useful for lining pipes and vessels made of metal, in protecting them from the contents, and from oxidation. For these purposes it may be used as a covering as well as a lining.

For many purposes an equivalent for rosin may be used, such as pitch, or other suitable equivalent containing their properties.

This composition may also be used for coating barrels, vessels, packages, eggs, fruits, and other articles which can be preserved by a coating that will exclude air or prevent atmospheric contact.

What I claim as new, and desire to secure by Letters Patent, is—

The mixture or composition of paraffine and rosin for lining or coating barrels, packages, other vessels or pipes, and coating eggs, fruits, and other articles, substantially as specified.

MATTHEW LAFLIN.

Witnesses:
 L. L. BOND,
 O. W. BOND.